United States Patent
Shaffer et al.

(10) Patent No.: US 8,831,664 B2
(45) Date of Patent: *Sep. 9, 2014

(54) SYSTEM AND METHOD FOR PROVIDING CHANNEL CONFIGURATIONS IN A COMMUNICATIONS ENVIRONMENT

(75) Inventors: Shmuel Shaffer, Santa Clara, CA (US); Steven Christenson, Santa Clara, CA (US)

(73) Assignee: Cisco Technology, Inc., San Jose, CA (US)

(*) Notice: Subject to any disclaimer, the term of this patent is extended or adjusted under 35 U.S.C. 154(b) by 470 days.

This patent is subject to a terminal disclaimer.

(21) Appl. No.: 13/210,967

(22) Filed: Aug. 16, 2011

(65) Prior Publication Data

US 2011/0299404 A1  Dec. 8, 2011

Related U.S. Application Data

(63) Continuation of application No. 12/340,417, filed on Dec. 19, 2008, now Pat. No. 8,041,378.

(51) Int. Cl.
*H04W 4/22* (2009.01)
*H04H 20/59* (2008.01)
*H04W 84/08* (2009.01)

(52) U.S. Cl.
CPC .............. *H04H 20/59* (2013.01); *H04W 84/08* (2013.01)
USPC ........... 455/521; 370/331; 370/465; 370/266; 370/270; 709/204; 709/227; 709/239; 709/224; 709/206; 709/223

(58) Field of Classification Search
USPC ................. 455/521; 370/331, 465, 266, 270; 709/204, 227, 239, 224, 206, 223
See application file for complete search history.

(56) References Cited

U.S. PATENT DOCUMENTS

| 4,359,603 A | 11/1982 | Heaton |
| 4,730,306 A | 3/1988 | Uchida |

(Continued)

FOREIGN PATENT DOCUMENTS

| CN | 101461152 | 6/2009 |
| EP | 0849964 | 6/1998 |

(Continued)

OTHER PUBLICATIONS

U.S. Appl. No. 12/722,389, entitled "System and Method for Providing Data Channel Management in a Network Environment," filed Mar. 11, 2010; Inventors: Shmuel Shaffer, et al.

(Continued)

*Primary Examiner* — Lam T Mai
(74) *Attorney, Agent, or Firm* — Patent Capital Group (57) ABSTRACT

A method is provided in one example embodiment and includes monitoring media streams associated with channels in a communication environment. The method also includes receiving an alert in one of the media streams and elevating a priority associated with the media stream receiving the alert. Elevating the priority can include increasing the volume of the media stream receiving the alert, changing a spatial direction for rendering the media stream receiving the alert, rendering the media stream receiving the alert to a priority spatial direction, identifying a primary channel and rendering the alert message to the primary channel, turning a volume down on media streams not receiving the alert, or a combination thereof.

20 Claims, 5 Drawing Sheets

(56) References Cited

U.S. PATENT DOCUMENTS

| | | |
|---|---|---|
| 5,048,082 A | 9/1991 | Krafft et al. |
| 5,099,510 A | 3/1992 | Blinken et al. |
| 5,436,896 A | 7/1995 | Anderson et al. |
| 5,539,741 A | 7/1996 | Barraclough et al. |
| 5,539,811 A | 7/1996 | Nakamura et al. |
| 5,625,407 A | 4/1997 | Biggs et al. |
| 5,689,245 A | 11/1997 | Noreen et al. |
| 5,889,769 A | 3/1999 | Mizuno |
| 6,006,848 A | 12/1999 | Grube et al. |
| 6,011,841 A | 1/2000 | Isono |
| 6,011,851 A | 1/2000 | O'Connor et al. |
| 6,094,578 A | 7/2000 | Purcell et al. |
| 6,094,579 A | 7/2000 | Olvera-Hernandez et al. |
| 6,151,309 A | 11/2000 | Busuioc et al. |
| 6,178,237 B1 | 1/2001 | Horn |
| 6,185,205 B1 | 2/2001 | Sharrit et al. |
| 6,233,315 B1 | 5/2001 | Reformato et al. |
| 6,327,567 B1 | 12/2001 | Willehadson et al. |
| 6,374,100 B1 | 4/2002 | Smith et al. |
| 6,385,461 B1 | 5/2002 | Raith |
| 6,400,816 B1 | 6/2002 | Hjalmtysson et al. |
| 6,404,873 B1 | 6/2002 | Beyda et al. |
| 6,408,327 B1 | 6/2002 | McClennon et al. |
| 6,418,214 B1 | 7/2002 | Smythe et al. |
| 6,421,002 B2 | 7/2002 | Krasner |
| 6,453,022 B1 | 9/2002 | Weinman, Jr. |
| 6,501,739 B1 | 12/2002 | Cohen |
| 6,501,740 B1 | 12/2002 | Sun et al. |
| 6,608,820 B1 | 8/2003 | Bradshaw, Jr. |
| 6,708,030 B1 | 3/2004 | Horikawa |
| 6,721,284 B1* | 4/2004 | Mottishaw et al. ........... 370/255 |
| 6,792,092 B1 | 9/2004 | Michalewicz |
| 6,813,250 B1 | 11/2004 | Fine et al. |
| 6,850,496 B1 | 2/2005 | Knappe et al. |
| 6,873,854 B2 | 3/2005 | Crockett et al. |
| 6,882,856 B1 | 4/2005 | Alterman et al. |
| 6,885,874 B2 | 4/2005 | Grube et al. |
| 6,912,389 B2 | 6/2005 | Bright et al. |
| 6,944,137 B1 | 9/2005 | Pan et al. |
| 6,965,767 B2 | 11/2005 | Maggenti et al. |
| 6,982,961 B2 | 1/2006 | Refai et al. |
| 6,987,480 B1 | 1/2006 | Kotick et al. |
| 6,987,841 B1 | 1/2006 | Byers et al. |
| 6,993,120 B2 | 1/2006 | Brown et al. |
| 6,996,088 B1 | 2/2006 | Kroon et al. |
| 6,996,406 B2 | 2/2006 | Lection et al. |
| 6,999,782 B2 | 2/2006 | Shaughnessy et al. |
| 6,999,783 B2 | 2/2006 | Toyryla et al. |
| 7,003,286 B2 | 2/2006 | Brown et al. |
| 7,006,607 B2 | 2/2006 | Garcia |
| 7,010,106 B2 | 3/2006 | Gritzer et al. |
| 7,010,109 B2 | 3/2006 | Gritzer et al. |
| 7,010,275 B2 | 3/2006 | Davies |
| 7,013,279 B1 | 3/2006 | Nelson |
| 7,031,700 B1 | 4/2006 | Weaver et al. |
| 7,034,678 B2 | 4/2006 | Burkley et al. |
| 7,035,385 B2 | 4/2006 | Levine et al. |
| 7,058,168 B1 | 6/2006 | Knappe et al. |
| 7,062,286 B2 | 6/2006 | Grivas et al. |
| 7,072,952 B2 | 7/2006 | Takehiro et al. |
| 7,079,857 B2 | 7/2006 | Maggenti et al. |
| 7,091,851 B2 | 8/2006 | Mason et al. |
| 7,149,477 B2 | 12/2006 | Ogami |
| 7,237,117 B2 | 6/2007 | Weiss |
| 7,271,742 B2 | 9/2007 | Sheha et al. |
| 7,292,544 B2 | 11/2007 | Roher et al. |
| 7,328,036 B2 | 2/2008 | Hart et al. |
| 7,339,900 B2 | 3/2008 | Perlman |
| 7,352,707 B2 | 4/2008 | Ho et al. |
| 7,369,513 B1 | 5/2008 | Sankaran |
| 7,369,530 B2 | 5/2008 | Keagy |
| 7,379,961 B2 | 5/2008 | Matsuoka |
| 7,418,090 B2 | 8/2008 | Reding et al. |
| 7,426,192 B2 | 9/2008 | Amano et al. |
| 7,460,492 B2 | 12/2008 | Portolani et al. |
| 7,463,597 B1 | 12/2008 | Kompella |
| 7,466,812 B1 | 12/2008 | Mahy et al. |
| 7,508,840 B2 | 3/2009 | Delaney |
| 7,526,306 B2 | 4/2009 | Brems et al. |
| 7,558,221 B2 | 7/2009 | Nelson et al. |
| 7,606,256 B2 | 10/2009 | Vitebsky et al. |
| 7,633,914 B2 | 12/2009 | Shaffer et al. |
| 7,636,339 B2 | 12/2009 | Shaffer et al. |
| 7,639,634 B2 | 12/2009 | Shaffer et al. |
| 7,706,339 B2 | 4/2010 | Shaffer et al. |
| 7,710,983 B2* | 5/2010 | Zheng et al. .................. 370/396 |
| 7,821,978 B2 | 10/2010 | Staack |
| 7,831,270 B2 | 11/2010 | Kalley et al. |
| 7,860,070 B2 | 12/2010 | Shaffer et al. |
| 7,860,958 B2 | 12/2010 | Yoon et al. |
| 7,869,386 B2 | 1/2011 | Shaffer et al. |
| 7,933,286 B2 | 4/2011 | Vitebsky et al. |
| 7,953,859 B1* | 5/2011 | Kiefhaber et al. ............ 709/227 |
| 8,041,378 B2* | 10/2011 | Shaffer et al. ................. 455/521 |
| 8,619,586 B2* | 12/2013 | Hanes et al. .................. 370/241 |
| 2002/0152305 A1 | 10/2002 | Jackson et al. |
| 2003/0055711 A1 | 3/2003 | Doherty |
| 2004/0139320 A1 | 7/2004 | Shinohara |
| 2004/0249949 A1 | 12/2004 | Gourraud et al. |
| 2005/0015444 A1 | 1/2005 | Rambo |
| 2005/0171954 A1 | 8/2005 | Hull et al. |
| 2005/0232207 A1 | 10/2005 | Antoniadis et al. |
| 2006/0114847 A1 | 6/2006 | Dssouli et al. |
| 2006/0118636 A1 | 6/2006 | Miles et al. |
| 2006/0165060 A1 | 7/2006 | Dua |
| 2006/0281471 A1 | 12/2006 | Shaffer et al. |
| 2007/0030144 A1 | 2/2007 | Titus et al. |
| 2007/0060144 A1 | 3/2007 | Mills et al. |
| 2007/0104121 A1 | 5/2007 | Shaffer et al. |
| 2007/0115848 A1 | 5/2007 | Chean et al. |
| 2007/0202907 A1 | 8/2007 | Shaffer et al. |
| 2007/0202908 A1 | 8/2007 | Shaffer et al. |
| 2007/0203996 A1 | 8/2007 | Davitz et al. |
| 2007/0239824 A1 | 10/2007 | Shaffer et al. |
| 2007/0266097 A1 | 11/2007 | Harik et al. |
| 2007/0271336 A1 | 11/2007 | Ramaswamy |
| 2007/0280203 A1 | 12/2007 | Shaffer et al. |
| 2007/0282621 A1 | 12/2007 | Altman et al. |
| 2007/0293240 A1 | 12/2007 | Drennan |
| 2008/0005249 A1 | 1/2008 | Hart |
| 2008/0037461 A1 | 2/2008 | Biltz et al. |
| 2008/0045236 A1 | 2/2008 | Nahon et al. |
| 2008/0159128 A1 | 7/2008 | Shaffer et al. |
| 2008/0167049 A1 | 7/2008 | Karr et al. |
| 2008/0280637 A1 | 11/2008 | Shaffer et al. |
| 2009/0144377 A1 | 6/2009 | Kim et al. |
| 2010/0159975 A1 | 6/2010 | Shaffer |
| 2010/0159977 A1 | 6/2010 | Shaffer |
| 2010/0161727 A1 | 6/2010 | Shaffer |
| 2011/0239252 A1 | 9/2011 | Kazama et al. |

FOREIGN PATENT DOCUMENTS

| | | |
|---|---|---|
| EP | 1622044 | 2/2006 |
| EP | 1920568 | 8/2006 |
| EP | 1889495 | 12/2006 |
| EP | 1920615 | 2/2007 |
| EP | 2030338 | 12/2007 |
| FR | 2674355 A | 9/1992 |
| WO | WO0191485 | 11/2001 |
| WO | WO02/074051 | 9/2002 |
| WO | WO2006/135533 | 12/2006 |
| WO | WO2007/021586 | 2/2007 |
| WO | WO2007/027356 | 3/2007 |
| WO | WO2007/142961 | 12/2007 |

OTHER PUBLICATIONS

PCT Feb. 10, 2001 International Search Report from PCT/EP01/04570; 1 page.

PCT Feb. 27, 2007 Notification of Transmittal of the International Search Report for PCT/US06/30447; 2 pages.

PCT Apr. 9, 2007 Notification of Transmittal of the International Search Report from PCT/US06/30294; 1 page.

(56) References Cited

OTHER PUBLICATIONS

PCT Sep. 4, 2007 International Search Report from PCT/US02/08419; 2 pages.
PCT Sep. 4, 2007 International Search Report and Written Opinion from PCT/US06/19227; 7 pages.
PCT Dec. 11, 2007 International Preliminary Report on Patentability (1 page) and the Written Opinion of the International Searching Authority (3 pages), for PCT/US06/19227.
PCT Feb. 12, 2008 International Preliminary Report on Patentability (1 page) and the Written Opinion of the International Searching Authority (14 pages), from PCT/US06/30447.
PCT Mar. 14, 2008 International Preliminary Report on Patentability (1 page) and the Written Opinion of the International Searching Authority or the Declaration (4 pages) for PCT/US06/30294.
PCT Sep. 17, 2008 Notification of Transmittal of the International Search Report and the Written Opinion of the International Searching Authority for PCT/US07/12728; 6 pages.
PCT Dec. 3, 2008 International Preliminary Report on Patentability (1 page) and the Written Opinion of the International Searching Authority (5 pages) from PCT/US07/12728.
USPTO Jun. 27, 2011 Notice of Allowance from U.S. Appl. No. 12/340,417.
USPTO Jul. 11, 2011 Nonfinal Office Action from U.S. Appl. No. 12/340,451.
USPTO Jan. 17, 2012 Response to Oct. 14, 2011 Nonfinal Office Action from U.S. Appl. No. 12/340,468.
USPTO Sep. 20, 2012 Non-Final Office Action from U.S. Appl. No. 12/722,389.
USPTO Oct. 4, 2013 Non-Final Rejection from U.S. Appl. No. 12/340,468.
USPTO Apr. 5, 2013 Notice of Allowance from U.S. Appl. No. 12/722,389.
Herther, Jay, et al., "Voice-Over-interintranet Protocol for Critical Communications," Urgent Communications, The Official Publication of IWCE, Aug. 2001, 3 pages http://urgentcomm.com/mag/radio_voiceoverintranet_protocol_critical/.
Interoperability Gateway, OpenSky, NetworkFirst, $P25^{IP}$, Data Sheet, M/A-COM, Inc. ECR-7054, [Printed on Jun. 28, 2011] http://www.pspc.harris.com/media/ECR-7054E_tcm27-10470.pdf.
McKay, Jim, "Intact Amid Chaos," Government Technology, Mar. 2005, 3 pages http://www.bultronic.net/documents/articles/intact%20amid%20chaos.pdf.
Urgent Communications: Service, Safety, Security, "5 for '05 Technologies," Dec. 1, 2004; 6 pages; http://urgentcomm.com/mag/publicsafety/radio_technologies/.
Urgent Communications: Service, Safety, Security, "M/A-Com Emphasizes Power of IP in Seven Announcents at APCO," Aug. 18, 2002, 5 pages http://urgentcomm.com/products/new/radio_macom_emphasizes_power/index.html.
NetworkFirst Interoperability Solved, Data Sheet, M/A-COM, Inc., ECR-7018A, [Printed on Jun. 28, 2011] 6 pages; http://www.kaomminc.com/PDF/NetworkFirstRevised5_03.pdf.

Polk, J., et al., "Dynamic Host Configuration Protocol Option for Coordinate-based Location Configuration Information," Network Working Group, Internet RFC 3825, Jul. 2004, 15 pages.
Rivero-Angeles, Mario et al., "Random-Access Control Mechanism Using Adaptive Traffic Load in ALOHA and CSMA Strategies for EDGE," IEEE Transactions on Vehicular Technology, vol. 54, No. 3, May 2005; Abstract Only http://ieeexplore.ieee.org/xpl/freeabs_all.jsp?arnumber=1433259.
Trimeche, M., "Digital Rights Management for Visual Content in Mobile Applications," published Sep. 27, 2004; ISBN )-7803-8379-6; © 2004 IEEE; http://ieeexplore.ieee.org; pp. 95-98.
$V^{IP}$ Dispatch Console, OpenSky, NetworkFirst, $P25^{IP}$, Data Sheet, M/A-COM, Inc. ECR-7241C, © 2006 M/A-COM, Inc., 2 pages http://www.bultronic.net/documents/NetworkFirst/VIP%20Dispatch%20Console.pdf.
USPTO Nov. 9, 2011 Notice of Allowance from U.S. Appl. No. 12/340,451.
USPTO Dec. 18, 2012 Response to Sep. 20, 2012 Non-Final Office Action from U.S. Appl. No. 12/722,389.
USPTO Mar. 9, 2012 Final Rejection from U.S. Appl. No. 12/340,468.
USPTO May 24, 2012 RCE Response to Mar. 9, 2012 Final Rejection from U.S. Appl. No. 12/340,468.
USPTO Oct. 11, 2011 Response to Nonfinal Office Action mailed Jul. 11, 2011 from U.S. Appl. No. 12/340,451.
USPTO Oct. 14, 2011 Nonfinal Office Action from U.S. Appl. No. 12/340,468.
Wikipedia, "Minimum spanning tree," http://en.wikipedia.org/wiki/Minimum_spanning_tree, Dec. 18, 2008, 5 pages.
Wikipedia, "Distributed minimum spanning tree," http://en.wikipedia.org/wiki/Distributed_minimum_spanning_tree, Dec. 18, 2008, 2 pages.
Bender, Ron, et al., "Multiple Choices for Critical Communications," Urgent Communications, The Official Publication of IWCE, Oct. 2001, 4 pages; http://urgentcomm.com/mag/radio_multiple_choices_critical_2/.
C3 Maestro$^{IP}$ Dispatch Console, OpenSKY, NetworkFirst, $P25^{IP}$, Data Sheet, M/A-COM, Inc. ECR-7160A, [Printed on Jun. 28, 2011] 2 pages http://www.pspc.harris.com/media/ECR-7160E_tcm27-10458.pdf.
Cisco IPICS, Solution Overview, "Collaborative Incident Response," © Cisco Systems, Inc. 2010, 2 pages, www.cisco.com/go/ipics.
Wikipedia, "Plectron," http://en.wikipedia.org/wiki/Plectron, Dec. 18, 2008, 2 pages.
Thunder Eagle, Inc.—Radio Wireless Alerting Systems, "MRI-100™: Multi Radio Interface," http://www.thuneagle.com/mri100.htm, Dec. 18, 2008, 2 pages.
Positron Public Safety Systems, "Product Specifications: Power RADIO," http://www.positron911.com/products/powerRADIO/powerRADIO_specs.asp, Dec. 18, 2008, 2 pages.

* cited by examiner

FIG. 5

SYSTEM AND METHOD FOR PROVIDING CHANNEL CONFIGURATIONS IN A COMMUNICATIONS ENVIRONMENT

RELATED APPLICATION

This Application is a continuation (and claims the benefit of priority under 35 U.S.C. §120) of U.S. application Ser. No. 12/340,417, filed Dec. 19, 2008, entitled "SYSTEM AND METHOD FOR PROVIDING CHANNEL CONFIGURATIONS IN A COMMUNICATIONS ENVIRONMENT," Inventor(s) Shmuel Shaffer, et al. The disclosure of the prior application is considered part of (and is incorporated by reference in) the disclosure of this application.

TECHNICAL FIELD OF THE INVENTION

This invention relates in general to the field of communications and, more particularly, to a system and a method for providing channel configurations in a communications environment.

BACKGROUND OF THE INVENTION

Communications architectures have grown increasingly complex in communication environments. This complexity has resulted in numerous protocols being implemented to satisfy endpoints and to intelligently respond to challenging situations. Push-to-talk (PTT) devices are commonly used in safety and security environments. PTT devices carried by emergency response personnel (ERT) can support a single channel or a plurality of channels.

Typically, a management center supports a plurality of channels, where less important channels are rendered to one ear, and channels that are more important are rendered to the other ear. Universally, channels are statically configured, where the volume of each channel can be manually adjusted by an end user. When important information needs to be broadcast, channels should be configured optimally. If the channels are not fully utilized, then messages are not received by their intended recipients.

Thus, the ability to offer a system or a protocol that offers an effective coordination for channels in a communications environment provides a significant challenge to network designers, component manufacturers, service providers, and system administrators alike.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes monitoring a plurality of channels provisioned for an endpoint. The method also includes reacting to an alert message by adjusting one of the channels for the endpoint. The adjustment is a selected one of increasing a volume associated with the channel receiving the alert message, or changing a spatial direction from which the alert message and an associated media stream are conveyed to the endpoint. In other embodiments, the adjustment provisions the alert message from a left ear to a right ear of an end user of the endpoint. In still other embodiments, the adjustment includes determining which is a primary channel of the channels and provisioning the alert message to the primary channel of the endpoint. The media stream associated with the alert message is also moved to a same spatial direction along with the alert message.

In still other embodiments, the adjustment includes turning a volume down on every other channel besides a channel being used for the alert message. In yet other embodiments, the adjustment includes using out-of-band signaling. In other embodiments, the method includes sending the alert message until feedback has been received, which indicates that the alert message has been acknowledged by the endpoint.

Figure 1:
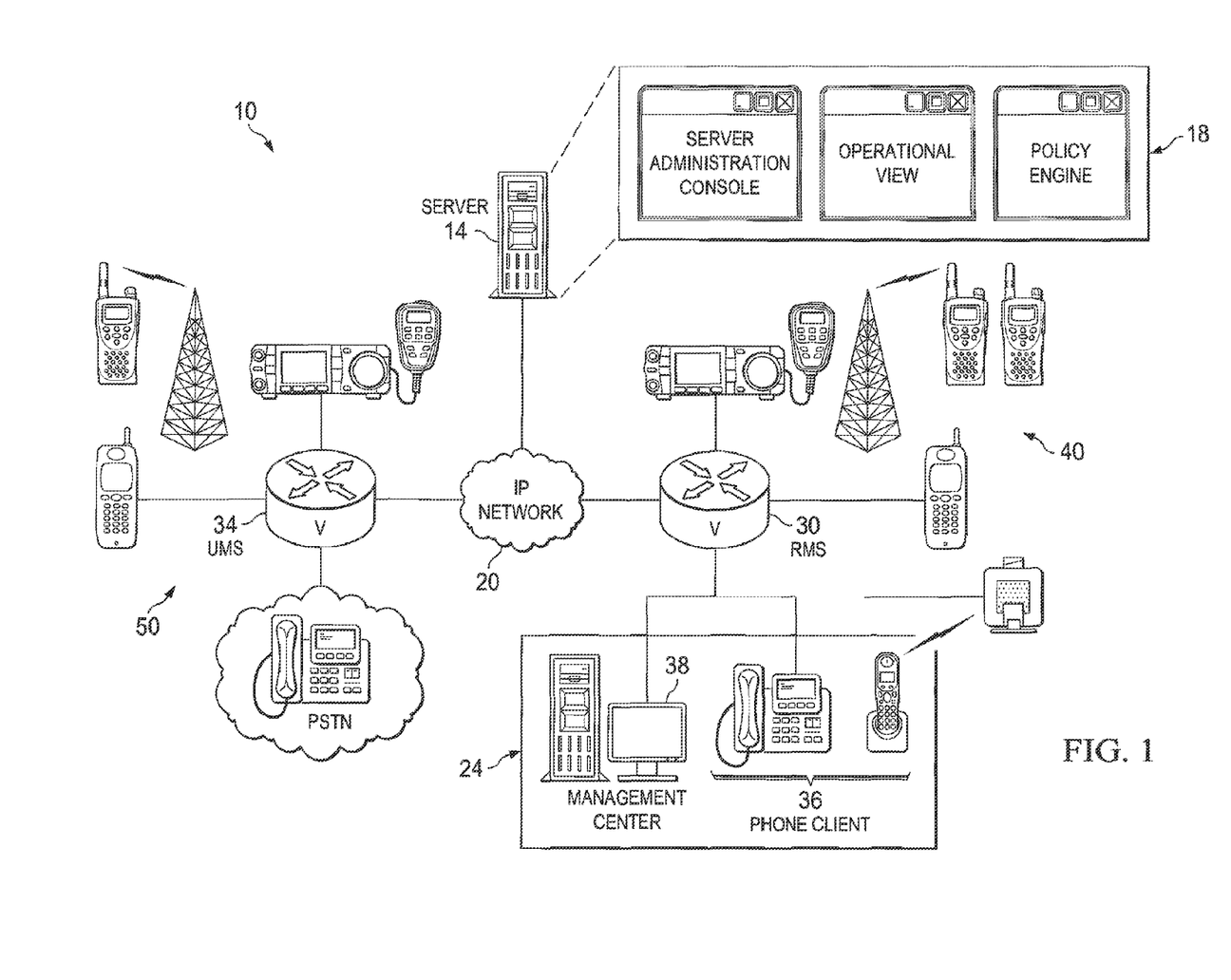
FIG. 1 is a simplified block diagram of a communication system for providing channel configurations in a communications environment in accordance with one embodiment of the present invention.

FIG. 1 is a simplified block diagram for coordinating communications received by one or more endpoints. Communication system 10 includes a server 14, which could include a server administration console, an operational view, and a policy engine: all of which are depicted as element 18. FIG. 1 also includes an IP network 20, which is coupled to a router media service (RMS) element 30 and a universal media service (UMS) element 34. UMS 34 is coupled to a public switched telephone network (PSTN) and can effectively coordinate sessions for a multitude of end-user devices, as is shown. RMS 30 is coupled to a management center 38 and a phone client 36. RMS 30 is also coupled to a series of end-user devices for which it may facilitate coordinating audio and/or data exchanges in the network.

Figure 2A:
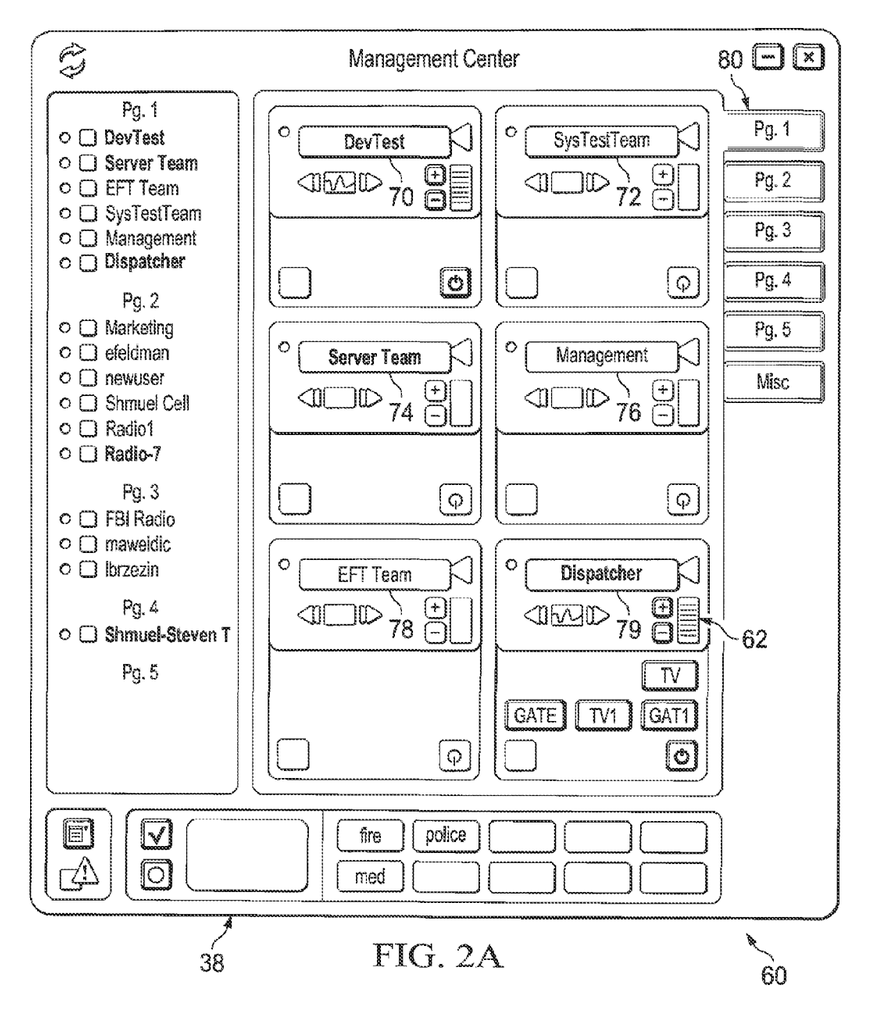
FIG. 2A is a simplified schematic diagram of a management center that may be part of the communication system in accordance with one embodiment of the present invention.

Note that the end-user devices of FIG. 1, as generally depicted at 40 and 50, are providing just some of the many examples that could be used in conjunction with the present invention. In a general sense, elements 40 and 50 are examples of field equipment, while element 24 is an example for end-user equipment, which resides in the control center. These devices (referred to as 'endpoint' as used herein in this document) may include VHF radios, UHF radios, PSTN telephones, IP phones, push-to-talk telephones, cellular telephones, laptops, desktop computers, personal digital assistants (PDAs), or any other suitable end-user device capable of exchanging audio or other data in the architecture. Before turning to the operational aspects of the present invention, FIG. 2A is briefly introduced. FIG. 2A is a simplified schematic diagram of a display 60, which can be part of management center 38. FIG. 2A includes one or more groups for which a particular end-user is subscribed. The groups include a DevTest 70, a SysTestTeam 72, a server team 74, a management group 76, an EFT team 78, and a dispatcher 79. Also provided are several pages on the left-hand side of the diagram, which help illustrate some of the end-users and some of the groups for this particular end-user. A tab 80 is also provided and can be used to expand the pages from the left-hand side of the user's screen. FIG. 2A also includes a volume control 62 and each of the channels can have its own volume adjustment.

For purposes of illustrating the techniques of communication system 10, it is important to understand the typical communications that may be traversing the network. The following foundational information may be viewed as a basis from which the present invention may be properly explained. Such information is offered earnestly for purposes of explanation only and, accordingly, should not be construed in any way to limit the broad scope of the present invention and its potential applications.

PTT devices, such as those shown in FIG. 1 [generally at 40 and 50], are commonly used in safety and security environments. PTT devices such as those [carried by emergency response personnel (ERT)] can support either a single channel or a plurality of channels. Management center 38 is an example of a PTT device, which supports a plurality of channels. Management center 38 can support a plurality of channels, where important channels are rendered to one ear (e.g., the right) and the less important channels are sent to the other ear (e.g., the left). It should be noted that some systems may provide users with the ability to position media streams at a variety of spatial arrival directions. The fact that we describe our system by way of example with respect to left and right ear should not be viewed as limiting it only to these two arrival directions.

A problem occurs when a user turns down the volume of a given channel and, as a result, cannot hear an alert tone or the conversation that follows on that channel. This may result in a user not responding to an important alert signal sent by another user, or by the system. Consider an example involving a police officer, who is on a UHF radio. Management center 38 can listen in on a multitude of channels. For the police officer in this example, audio channels can be configured on his device such that certain types of audio data will be directed to either the left ear or the right ear. For example, one typical application could involve configuring a management center 38 to render to the right ear of the dispatcher communication over a UHF radio channel and turning the volume up on that channel. The left ear could be configured to receive passive communications that may not be critical to the police officer's routine activities (e.g., a VHF channel).

Following along with this example of the police officer, an urgent message is broadcast over this VHF radio. The channel could be called "North District" or "City Works" in this example. In this example, an officer has been shot or has been inured such that he requires assistance. In this instance, the alert came on the VHF non-high priority channel. This alert message may or may not have been heard by other officers, or, because the volume on that specific channel may have been turned down, the officer may not hear the following communication on the low priority VHF channel.

In accordance with the techniques and teachings of the present invention, communication system 10 can readily identify this alert message and respond in any number of ways to ensure that the message was properly received. One intelligent response mechanism of the present invention provisions communications from the left ear to the right ear or vice versa. Another intelligent response mechanism simply turn up the volume on a channel that the alert. Note that these responses could easily be combined into an automatic reconfiguration.

Another intelligent response for this scenario is for management center 38 to identify which channel is the primary channel for one or more end-users. Due to the urgency of this event alert, the system responds by moving the alert message to the primary channel and marginalizing all the other channels for a configurable period. Part of this response also includes turning the volume down on every other channel. Thus, management center 38 can promptly identify an event alert and coordinate a suitable response autonomously, or in conjunction with a server that would assist in provisioning the appropriate channels.

In other embodiments, a resource management server (capable of processing media services) can coordinate an effective response that includes either an audio tone or a message being sent out-of-band. This server could be UMS 34 or RMS 30. For the out-of-band signaling, the identification of the alert is provided in the header of a packet, in the payload of the packet, in control packets, or in any other suitable location. Furthermore, this out-of-band signaling is sent to management center 38, which can assist in processing this data. Management center 38 promptly identifies the information included in these packets. In the case of out-of-band signaling, if an end user has stepped out (for whatever reason), because the specific channel has been moved, the actions taken by the system in response to the alert could signify to him what has occurred while he was away.

As can be appreciated by the foregoing description and the discussions herein, the coordination of the responses for these alert messages can occur at the edge of the network, at a server, or performed as a hybrid of these functions. The server is predominantly part of the network in the context of some of these discussions. Thus, an alert event can be captured and subsequent responses properly coordinated by management center 38, server 14, RMS 30, or UMS 34. All of these elements can have the intelligence to dictate an effective response mechanism, as prescribed herein.

Before turning to some of the operations of this architecture, a brief discussion is provided about some of the infrastructure of FIG. 1. Software (which manages the operations of the system in accordance with some embodiments of the invention) can reside in the network. By "reside in the network" such terminology is meant connote that the software can be hosted on any suitable device or component, for example, included in management center 38, server 14, RMS 30, and UMS 34. These elements may include any suitable combination of software or hardware to execute the response mechanisms and/or perform the coordination of channels as outlined herein. All of these elements may be referred to as 'management elements' as used herein in this Specification, which could be routers, switches, gateways, bridges, loadbalancers, firewalls, servers, or any other suitable device, component, element, or object operable to assist in these activities. Moreover, these management elements may include any suitable hardware, software, components, modules, interfaces, or objects that facilitate the operations thereof. This may be inclusive of appropriate algorithms and communication protocols that allow for the effective exchange of data or information in the architecture.

Each of these management elements can also include memory elements for storing information to be used in achieving the channel management and coordination operations as outlined herein. Additionally, each of these devices may include a processor that can execute software or an algorithm to perform the management activities as discussed in this specification. Memory elements and processors (which facilitate these outlined operations) may be included in these management elements or provided externally to these elements, or consolidated in any suitable fashion. The processors can readily execute code (software) for effectuating the activities described. These devices may further keep information in any suitable random access memory (RAM), read only memory (ROM), erasable programmable ROM (EPROM), electronically erasable PROM (EEPROM), application specific integrated circuit (ASIC), software, hardware, or in any other suitable component, device, element, or object where appropriate and based on particular needs.

Note also that the specific coordination and response mechanisms may be provided external to any of the management elements, as opposed to provided internally. In addition, some, all, or none of these operations may be suitably combined across these elements, or provided in just one element to accomplish the operations as outlined herein in this document.

Turning to a particular component that may be entrusted with some of these response obligations, the UMS is the component that receives the audio streams in the architecture in certain embodiments of the present invention. It is not necessarily the only component that receives this audio information. The UMS can also receive out-of-band messages, and it too can have information regarding who is registered and who is listening to messages in the architecture. The UMS can simply re-stream media that it receives in certain embodiments. Because the UMS has information regarding who is listening on giving channels, it too can take the initiative in provisioning channels for endpoint devices. It has the intelligence to understand which streams should be given priority over other streams. Thus, the UMS can shift the streams or it can elect which streams and at which volume should propagate to end user devices.

In typical scenarios, users may be listening to multiple channels simultaneously. For a user to be able to listen to multiple channels, the media streams of the channels need to be mixed in a two dimensional mixer. A two dimensional mixer is a mixer that facilitates assigning of media streams to left and/or right ear. This mixer can also control the relative volume of each media stream played to the right and left ear. In accordance one example implementation, multiple media streams arrive at management center 38 and the mixing of these media streams takes place in management center 38.

In accordance with another example aspect of the present architecture, multiple media streams arrive at UMS 34 or RMS 30 and are being mixed there. The resulting two media streams (per user] are then streamed from the RMS/UMS to management center 38. Such an architecture has the advantage that the bandwidth it needs [between management center 38 and IP network 20] is enough to accommodate two media streams. In a hybrid architecture, some mixing takes place on the UMS/RMS and some at management center 38 is also covered by our invention. In this sense, the provisioning is being done externally, and the individual endpoints do not have to be capable of managing these alert messages.

Note that in previous embodiments, management center 38 would perform a certain amount of mixing functions for the endpoints. For example, ten different media streams could be propagating down to management center 38, which is relegated to task of managing the streams from multiple endpoints. Management center 38 is assigning each of those streams to either the left ear or the right ear or both. By properly managing the volume of the mixed channels, any channel can be configured to appear for the user from any designated arrival direction. Furthermore, each channel is receiving the stream at a prescribed volume.

This mixing functionality (which could be provided in software or in hardware) could effectively be moved to the UMS such that these activities are performed by one or more alternative components, and not necessarily performed by management center 38. In this sense, this functionality has been moved into the network (potentially residing on a server that includes a processor and a memory element for storing code to be executed by the processor) and this embodiment is certainly within the broad scope of the present invention.

In other scenarios, management center 38 is monitoring all of the received media streams, where it can detect that media should be rendered to an active channel whose volume was set below a given threshold, and then assumes that the alert may have to be duplicated or a volume adjustment should be made. One reaction to this scenario would be to increase the volume of the channel where the tone is played and relatively decrease the volume of chatter on other channels. Please note that teachings of the present invention do not solely accommodate alert tones. Such an architecture can also handle events, where the priority of a given channel is elevated by the dispatcher, or when a dispatcher adds a high priority virtual talk group (VTG) to the channel. Note that the priority of the channel is elevated not only for the alert tone, but also for the following media stream. This is done by increasing the volume of the said channel and by moving it to the priority direction, e.g., right ear.

In still other scenarios, the present architecture can continuously signal the alert until feedback has been received that indicates that the alert has been acknowledged. In other embodiments, the alert could be continuously increased in volume and/or duration until properly acknowledged by an endpoint (either vocally, through software, through out-of-band signaling, etc.).

Figure 2B:
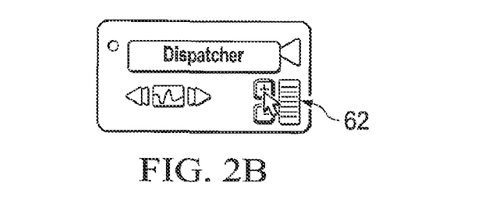
FIG. 2B is a simplified schematic diagram of an aspect of the management center in accordance with one embodiment of the present invention.

Turning now to some of the potential infrastructure of example embodiments of the present architecture, FIG. 2B is a simplified schematic diagram of the dispatcher channel controls and includes volume control 62. Various components of the architecture can control volume parameters on individual channels. Thus, channel controls can be independent of one another. Note also that management center 38 can be implemented in either software or hardware. Some of the FIGURES show management center 38 being implemented in software and, therefore, the buttons in FIGS. 2A and 2B are soft buttons. The present invention covers implementations of the system in hardware, software or any hybrid implementation of these elements.

Figure 3:
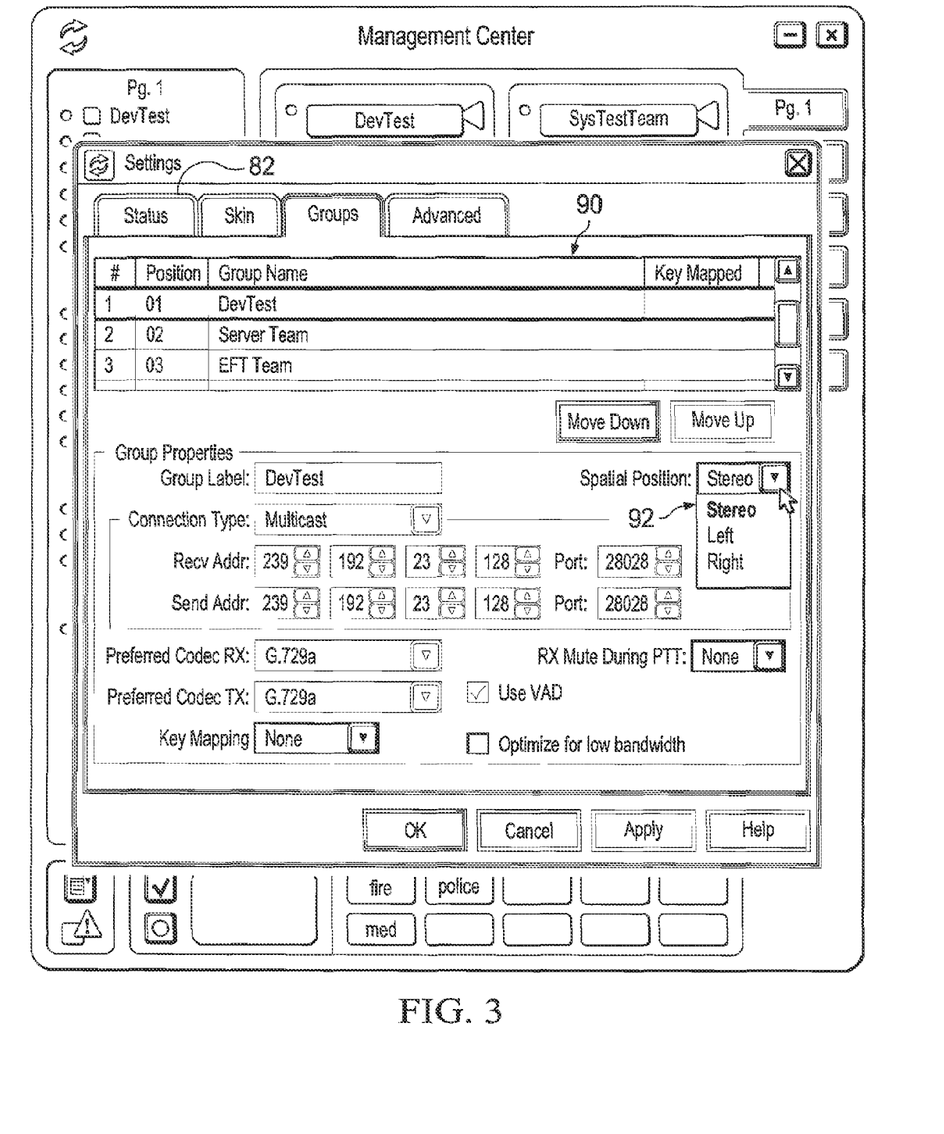
FIG. 3 is a simplified schematic diagram of an element that may be part of the management center in accordance with one embodiment of the present invention.

FIG. 3 is a simplified schematic diagram of a settings element within the management center. The settings include a status 82, a series of groups 90, and a spatial position 92. The groups 90 are depicted having certain positions, which may signify their respective priorities. The configuration of a specific position for any given communication group controls the location of this specific channel on the management center screen, as shown in FIG. 2A. In this example, the management team is relegated to position number five, whereas the DevTest group, which was configured to position 01 has the highest priority and, therefore, is positioned at the top left of the management center screen. These groups may be configured by an end-user, a manager, or by an administrator of the system based on particular needs. Spatial position 92 includes a drop-down menu in which the user may select stereo, left, right, or another configuration for channels to be heard by an end-user. Also provided in FIG. 3 is a skin tab, which can be selected in order to change the appearance of management center 38.

Figure 4:
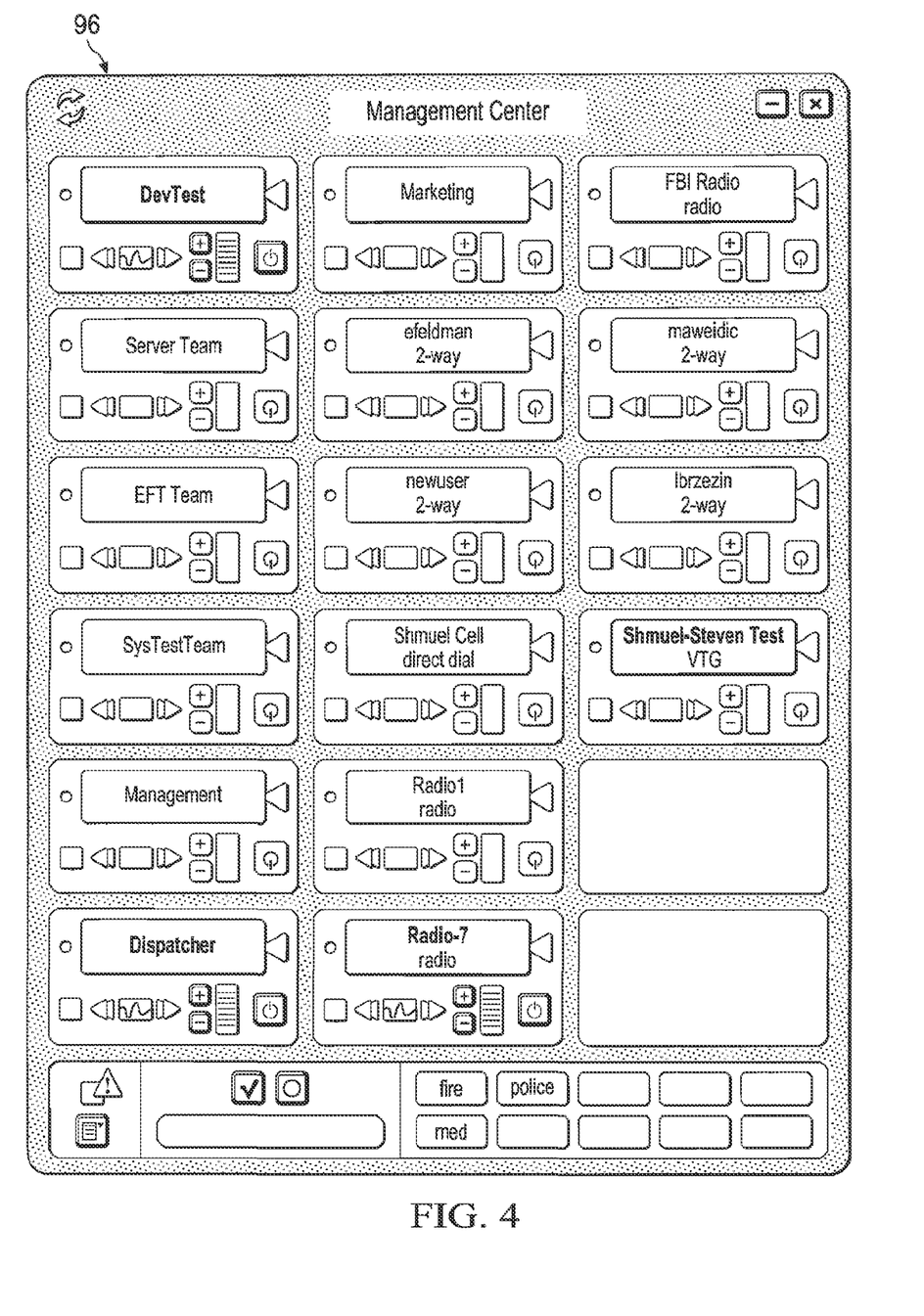
FIG. 4 is a simplified schematic diagram illustrating another example implementation of the management center.

FIG. 4 is a simplified schematic diagram of an example management center 96. In this example case, the layout has changed and a number of important groups are highlighted for this particular end-user, who will receive alert messages intended for the groups for which he is subscribed (or configured). It is important to note that any suitable configuration or selection of end user groups may be accommodated by the present invention Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the preceding flows illustrate only some of the possible scenarios that may be executed by, or within, communication system 10. Some of these steps may be deleted or removed where appropriate, or these steps may be modified or changed considerably without departing from the scope of the present invention. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present invention.

Although the present invention has been described in detail with reference to particular arrangements and configurations, these example configurations and arrangements may be changed significantly without departing from the scope of the present invention. For example, although the present invention has been described with reference to particular communication exchanges involving channels, communication system 10 can also manage alerts and events on other pathways. Note also that the term 'alert message' as used herein in this Specification is meant to connote any type of message or signal that was intended for one or more end users. The message may inform the end users or apprise them of some situation, or alternatively simply convey some information from a sender. This may include simple conversational exchanges and/or simple correspondence between two end users operating their endpoints.

The present architecture can also resolve any possible conflict between one or more alerts. This may involve a simple priority designation such that one alert is sounded or sent over (or in place of) another, or it may involve delay mechanisms, where one alert is sent along at a later time. Additionally, although described with reference to emergency, police, and fire fighter type applications, the present invention can certainly be used in operational environments where there are communication flows propagating amongst users within a given group. These communication environments could involve non-emergency scenarios.

Figure 5:
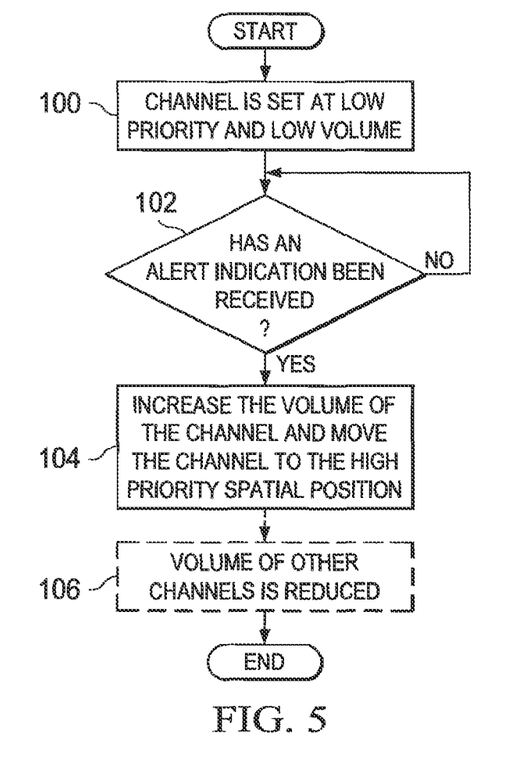
FIG. 5 is a simplified flowchart illustrating a scenario implicating the communication system.

FIG. 5 is a simplified flowchart illustrating an example scenario involving communication system 10. The flow begins at step 100, where a channel of an end-user device is set at a low priority and at a low volume. In this example, the end user is part of some group for which alert messages are sent. The name of this group is Eastern District Fire for this hypothetical. At step 102, the system checks to identify if an alert indication has been received.

If the answer to this query is NO, then the process circles back to the decision block of the flow. If, however, the answer to this query is YES, then the process moves to step 104, where the volume of the channel is increased and/or, the system moves the channel to the high priority spatial position.

At step 106, the volume of other channels is reduced in this example. Note also that the system is designed to check to see if multiple alerts were received at the same time. When this occurs, the system may delay one of the alert tones (but not the other actions, e.g., volume increase and move to high priority spatial position) to ensure that the user is made aware that multiple alerts for multiple events were sent. Any suitable combination of these response reactions are certainly within the broad scope of the present invention.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. A method, comprising:
 monitoring media streams associated with channels in a communication environment;
 receiving an alert in one of the media streams; and
 elevating a priority associated with the media stream receiving the alert, such that an adjustment is made to how the media stream is provisioned to an endpoint in the communication environment.

2. The method of claim 1, wherein elevating the priority comprises increasing the volume of the media stream receiving the alert.

3. The method of claim 1, wherein elevating the priority comprises changing a spatial direction for rendering the media stream receiving the alert.

4. The method of claim 1, wherein elevating the priority comprises increasing the volume of the media stream receiving the alert and changing a spatial direction for rendering the media stream receiving the alert.

5. The method of claim 1, wherein elevating the priority comprises rendering the media stream receiving the alert to a priority spatial direction.

6. The method of claim 1, wherein elevating the priority includes identifying a primary channel and rendering the alert message to the primary channel.

7. The method of claim 1, wherein elevating the priority includes turning a volume down on media streams not receiving the alert.

8. The method of claim 1, wherein the alert is received in a header of a packet of the media stream.

9. The method of claim 1, wherein the alert is received in a control packet of the media stream.

10. The method of claim 1, wherein the alert is duplicated and rendered at a higher volume.

11. Non-transitory readable media that includes code for execution and when executed by a processor operable to perform operations comprising:

monitoring media streams associated with channels in a communication environment;

receiving an alert in one of the media streams; and elevating a priority associated with the media stream receiving the alert.

12. The non-transitory readable media of claim 11, wherein elevating the priority comprises increasing the volume of the media stream receiving the alert.

13. The non-transitory readable media of claim 11, wherein elevating the priority comprises changing a spatial direction for rendering the media stream receiving the alert.

14. The non-transitory readable media of claim 11, wherein elevating the priority comprises increasing the volume of the media stream receiving the alert and changing a spatial direction for rendering the media stream receiving the alert.

15. The non-transitory readable media of claim 11, wherein elevating the priority includes identifying a primary channel and rendering the alert message to the primary channel.

16. An apparatus, comprising:
a memory element;
a processor; and
a management element stored in the memory element and configured to interface with the processor such that the apparatus is configured for:

monitoring media streams associated with channels in a communication environment;

receiving an alert in one of the media streams; and elevating a priority associated with the media stream receiving the alert.

17. The apparatus of claim 16, wherein elevating the priority comprises increasing the volume of the media stream receiving the alert.

18. The apparatus of claim 16, wherein elevating the priority comprises changing a spatial direction for rendering the media stream receiving the alert.

19. The apparatus of claim 16, wherein elevating the priority comprises increasing the volume of the media stream receiving the alert and changing a spatial direction for rendering the media stream receiving the alert.

20. The apparatus of claim 16, wherein elevating the priority includes identifying a primary channel and rendering the alert message to the primary channel.

* * * * *